J. BECKER.
FINDER.
APPLICATION FILED AUG. 7, 1918.

1,305,984.

Patented June 3, 1919.
2 SHEETS—SHEET 1.

Inventor
Joseph Becker

Inventor
Joseph Becker

UNITED STATES PATENT OFFICE.

JOSEPH BECKER, OF WASHINGTON, DISTRICT OF COLUMBIA.

FINDER.

1,305,984.      Specification of Letters Patent.      Patented June 3, 1919.

Application filed August 7, 1918. Serial No. 248,807.

*To all whom it may concern:*

Be it known that I, JOSEPH BECKER, a citizen of the United States, residing at Washington, in the District of Columbia, have invented a new and useful Improvement in Finders, of which the following is a specification.

My present patent application, identified for convenience of reference as my Case Bb, is, as to the main part thereof, a continuation of my herein merged, and therefore hereby abandoned, prior application, Case Ap, Serial No. 133,162, which was filed November 24, 1916, as Division 2 of my still earlier or parent application, Case J, Serial No. 246,169, filed February 17, 1905, now Patent No. 1,210,136, issued December 26, 1916.

The disclosure in my said Case Ap, is incomplete, because it does not set forth the structural conditions which must be satisfied in order to insure that the presence, of what I have hereinafter called the "self-corrective feature", shall not depend upon mere chance or accident.

My present application, Case Bb, and my hereinafter specifically referred to applications or patents, may all be listed in their letter name or filing date order, as follows: Case C, filed June 4, 1901, now Patent No. 1,178,476, issued April 4, 1916; my said parent application, Case J, now Patent No. 1,210,136, issued December 26, 1916; Case Ah or Division of C, now Patent No. 1,210,134, issued December 26, 1916; Case An or Division one of J, now merged and continued in Ao; Case Ao, now Patent No. 1,210,137, issued December 26, 1916; Case Ap or Division two of J, now merged and continued in the present Case Bb; Case Aq or Division three of J, now Patent No. 1,280,133, issued October 1, 1918; Case Ar or Division four of J, now Patent No. 1,283,633, issued November 5, 1918; Case As or Division five of J, now Patent No. 1,289,088, issued December 31, 1918; Case Ba or sixth and final division of J, now Patent No. 1,296,156, issued March 4, 1919; my present application, Case Bb merging and continuing Ap or Division two of J.

My present invention relates to finders of the eccentric lens type disclosed in my said Cases C, J, Ah, Ao, Aq, Ar, As; its object is to facilitate the manufacture of finders that are accurate; and to this end it consists in designing the finders so that exact half lenses may be used in place of lenses having any other degree of eccentricity.

The exact half lens has two important advantages, to-wit: First, every full lens contains, and yields, two exact half lenses; secondly, each of these half lenses is easily made of its intended degree of eccentricity, by carefully splitting the full lens through its thinnest point.

The half lens, moreover, assumes additional importance, wherever a single deep eccentric lens can be replaced by two shallow half lenses of the same focal length; for, in such case: (1) the two long focus half lenses will produce a far superior image; (2) they may be taken in the same shallow centric lens; and (3) they may be made in such manner that any error committed in the centering of the one, shall necessarily be made, of opposite sign, equal extent, and therefore compensatory, in the other.

The presence of this "self-corrective feature" is insured by not splitting the centric lens until the two parallel side edges H and K have been ground to fit in the finder casing, and the two dioptric faces have been ground and polished.

From the manufacturer's standpoint this "self-corrective feature" is very important, because it permits of making the lenses with not more than ordinary care.

My invention is specially useful as a separate article of manufacture, with self-contained sighting means, for use as an attachment to any camera.

In the accompanying drawings: Figure 1 is a vertical section of one form of my invention.

Figure 5:
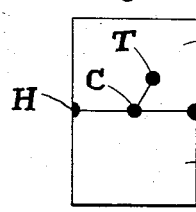
Fig. 5 shows the concave face of a blank, peripherally trimmed to its ultimately intended rectangular form, and which has just been split along HK, but whose thinnest point happens to be located at T, instead of being where intended, at C, midway between H and K.
Figure 6:
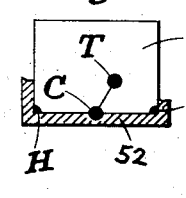
Fig. 6 shows the concave face of the Fig. 5 upper segment 50' as said segment appears when mounted in the finder casing 52, with its thinnest point at T.
Figure 7:
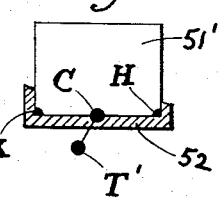

Fig. 7 shows the concave face of the Fig. 5 lower segment 51, as said segment appears when mounted in the finder casing 52, in front of the previously mounted segment 50', and with its thinnest point, imaginary, at T'.

Figure 8:
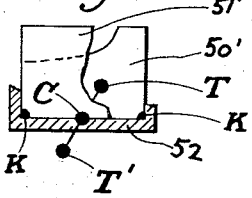

Fig. 8 is the same view as Fig. 7, with parts broken away, to show that the thinnest point of the resultant doublet must evidently be at C, midway between T and T'.

Figure 9:
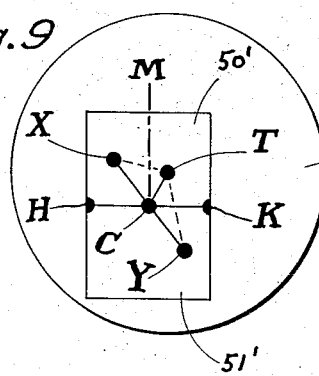

Fig. 9 shows the Fig. 5 blank as an eccentric rectangular segment of the full lens L' in which it was taken.

Figure 2:
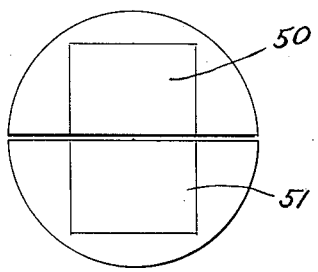
Fig. 2 is a diagram of the full lens blank, showing the dividing lines which must be made in it, to determine the two half lenses 50, 51, used in Fig. 1.
Figure 10:
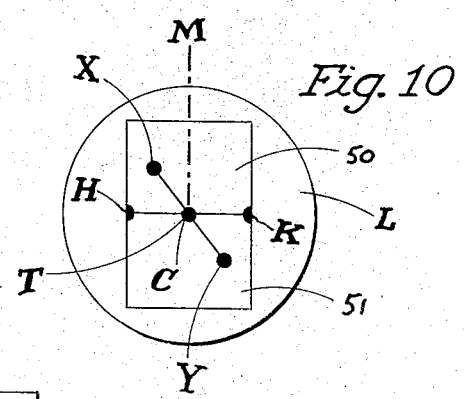

Fig. 10 shows the Fig. 2 blank as a concentric rectangular segment of the full lens L in which it was taken.

Figure 11:
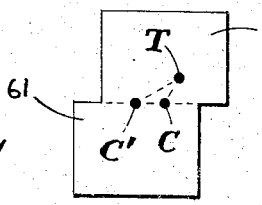

Fig. 11 shows two re-united half-lens elements 60, 61, of the kind that is not self-corrective, and that would generally be produced by, first, splitting the full lens, secondly, trimming each half lens separately from its semi-circular to its finally desired rectangular shape.

Figure 1:
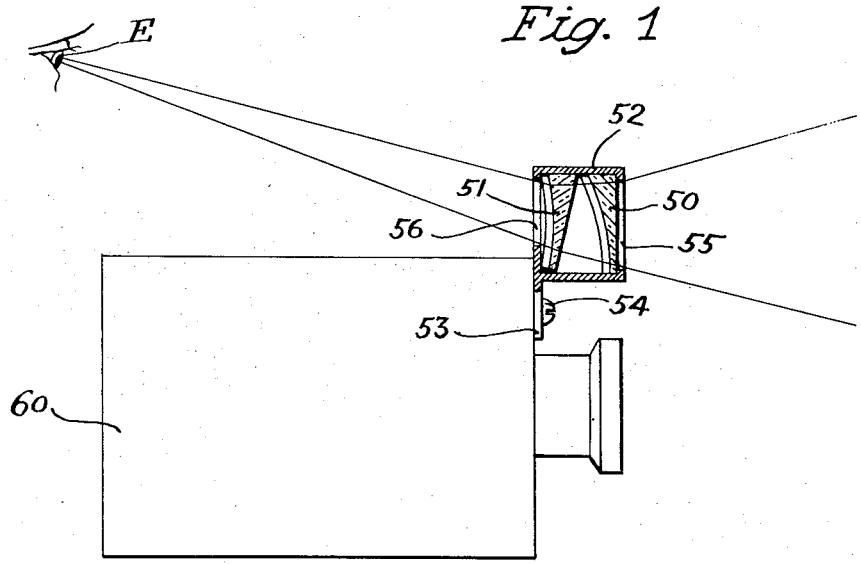

The rectangular half lenses 50, 51, Fig. 1, are mounted in a suitable casing 52. The entrance window 55, of the casing 52, is made as large as practicable, and the doublet is made of the proper focal length to secure the angular field desired.

The rear window 56 is cut so as to just allow the group of rays which is admitted by the front window 55, to pass on through to the eye at E, so that no other sighting means is required. That is to say, the operator knows that his eye is in a proper position when he sees the rear window 56, apparently registering with the front window 55.

Such finder, containing its sighting means within itself, may be used in any position on the camera, provided only its entrance window 55 be set with its edges parallel to the corresponding edges of the plate or film held inside the camera.

This, therefore, is a very useful form of finder which is adapted to be used as an attachment to any camera of any character.

Figure 4:
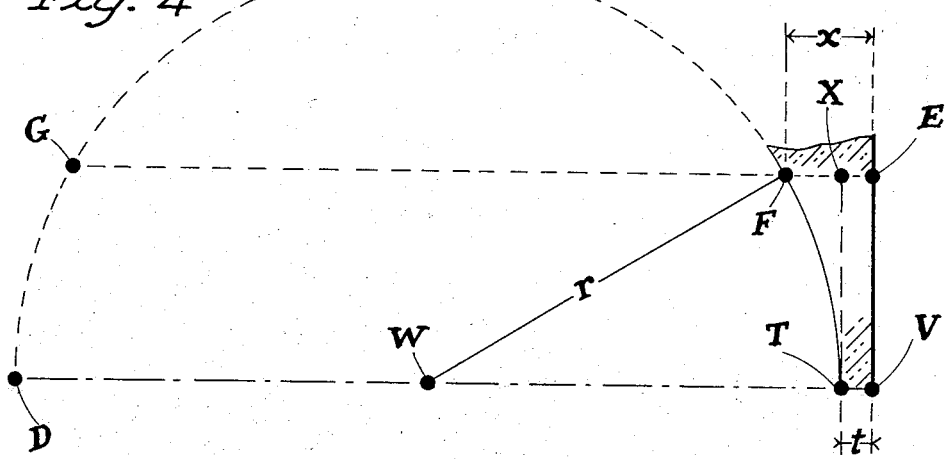
Fig. 4 is a diagram showing how to calculate the thickness $x$ of a plano-concave lens, at any distance, TX, from the principal axis WT of the lens.

I show it mounted on a box camera 60, where it necessarily projects, as much in fact as would the equivalent centric divergent lens finder, over which, however, even in its projecting position, it still retains the advantage of forming the finder image directionally close by the original object and without concealing the same, as illustrated for the letter L in Fig. 4 of my said Case Aq.

The mounting may be made permanent as shown by means of a tail piece 53, and screw 54; but, wherever the finder has to project, it had better be mounted so as to be, readily, mounted and unmounted.

This may be done, as in several older forms of the centric divergent lens finder, by dispensing with the tail piece 53, and providing the sides and the bottom of the casing 52, each with a dovetail adapted to fit in corresponding female dovetail fittings permanently fastened to the camera at any place where the finder may be needed.

In folding cameras, the same finder can generally be mounted about as in my Case-Ao Fig. 1; or as in my Case-As Fig. 1; or even on the hinged bed of the camera; so that it will not project and so it will, without attention, find its way into the camera, when the same is being folded.

By suppressing the tail piece 53 of the casing 52, the casing may be made to fit in the lens housing of my Case-Ba Figs. 1 to 5, or in place of the single lenses of my Case-Aq Figs. 1 to 12; and if the half lenses are used without their casing in said Case-Aq Figs. 1 to 12, then the finders must be made of the size that will permit of using the rear sights of these forms.

In my Case-Aq Figs. 10 to 12, or in my Case Ar, the doublet lens may be substituted for the single lens without any difficulty, as these forms contain means for changing the line of sight to accommodate any degree of eccentricity that the lens may have.

Figure 3:
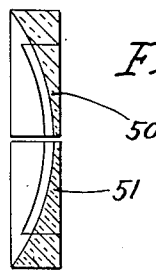
Fig. 3 is a vertical middle section of the diagram, Fig. 2.

The casing 52 may be made to open like the finder casing of my Case-J Figs. 3 and 5, or Case-Ao Fig. 8.

The image formed by the doublet will be improved by cutting off the upper part of lens 51, and raising it to reduce the eccentricity in accordance with the principles of my Case-J Fig. 3, or my Case-Ao Fig. 8. Such rear half lens might be taken in a much smaller full lens, and the result obtained would be better, provided the lenses were perfectly centered.

A further advantage is to be gained by making the doublet so the work of refraction shall be equally divided between the two lenses. This is obtained by making the focal length of the rear lens 51 shorter than the focal length of the front lens 50 by an amount approximately equal to the distance between the two lenses.

The best form of doublet, where expense is not to be considered, would therefore consist of two perfectly centered half lenses differing in focal length and arranged with the lens of shorter focal length at the back, and so that their joint principal axis shall be inclined with relation to the principal axis of the camera.

The doublet seen in my Case-Ao Fig. 8, or Case-J Fig. 3 has the proportions required to divide the work of refraction equally between the two lens segments.

Exact half lenses might be used in the said Case-Ao Fig. 8, by choosing the focal lengths of the lengths necessary to insure that the relation between the two finder fields shall be the same as the relation between the two camera fields.

*Theory of the exact half lens doublet of Fig. 1.*

The exact half lens doublet of Fig. 1 is therefore not the best in all cases. It has an important practical advantage, however, provided the separation of the segments along line HK, Fig. 10, or Fig. 9, be delayed until after the parallel side edges H and K of the undivided blank have been trimmed to fit in the casing 52; for then any slight error in the position of the dividing line HK, and any error in the centering of the lens before such division is made, are automatically corrected or compensated when the two segments are properly assembled in the casing 52, in their relative position of use.

This may be proved by establishing, with the aid of Figs. 4 to 10, a general formula for the effective thickness of the doublet, at any distance CX from the lowest, middle, and thinnest point C of the doublet.

The manner in which the two doublet elements are assembled in the finder casing 52 is made clear in Figs. 5 to 8, whose brief description, given above, should again be read carefully, as an introduction to what follows.

The lower segment 51', in Fig. 5, may be considered as being brought into its position of use, opposite the upper segment 50', by being, first, lifted or translated toward the observer, so as to clear the upper segment 50'; then, rotated in its own plane, about axis C, through two right angles. This operation produces, in Fig. 5, the same assembled doublet that is seen in Fig. 8, where the thinnest point T of segment 50', and the thinnest imaginary point T' of segment 51', are symmetrically located with reference to point C.

It is therefore plain that, as a result of such 180 degrees rotation about point C, any two points X and Y, Fig. 9, which eventually come directly opposite each other in the doublet, must be alined with, and equidistant from point C.

That is to say, for any given point X, we shall have, first $$CY = CX \quad \quad (1)$$

and, secondly $$\cos TCY = -\cos TCX \quad (2)$$

which holds because the angles TCX and TCY are at all times supplementary, and the cosine of angle TCY is always equal to minus the cosine of the supplementary angle TCX.

The effective thickness of the doublet, Fig. 8, at any distance CX from its thinnest point C, must therefore be equal to the sum $(x+y)$ of the thicknesses at corresponding points X and Y in said Fig. 9.

Referring to Fig. 4, let WT be the principal axis of a plano-concave lens whose upper half TVEF is alone shown in the figure.

Any such lens TVEF is the equivalent of a cemented pair comprising: (1) a glass plate TVEX of uniform thickness $t$; and (2) a plano-concave lens TXF which is infinitely thin at T.

The thickness of such lens, at any distance TX from the principal axis WT is therefore EX plus XF or $t$ plus XF.

But TX being a tangent to the circle W, while XG is a secant, it is known by geometry that $$XF = TX.TX/XG$$

or approximately, $$XF = TX.TX/2.r$$

Hence in any full plano-concave lens, whose thickness at the vertex or thinnest point T, is equal to $t$, the thickness at any point X may be represented by the general formula $$x = t + \frac{TX.TX}{2.r} \quad \text{---------(3)}$$

and its thickness, at the corresponding point Y must be $$y = t + \frac{TY.TY}{2.r} \quad \text{---------(4)}$$

so that the joint thickness at X, in the doublet Fig. 8, must be $$(x+y) = 2.t + \frac{TX.TX + TY.TY}{2.r} \quad \text{---} (5)$$

Now by trigonometry, the triangles TCX and TCY in Fig. 9 yield $$TX^2 = CX^2 + CT^2 - 2.CX.CT.\cos TCX \_ (6)$$
$$TY^2 = CY^2 + CT^2 - 2.CY.CT.\cos TCY \_\_ (7)$$

But, in view of equations 1 and 2, equation 7 may be re-written as $$TY^2 = CX^2 + CT^2 + 2.CX.CT.\cos TCX \_ (7')$$

and this equation 7' added to equation 6 makes $$TX^2 + TY^2 = 2.CX^2 + 2.CT^2 _____(8)$$

Equation 5 may accordingly be re-written as $$(x+y) = 2t + \frac{2.CX^2 + 2.CT^2}{2.r}$$

or in clearer form $$(x+y) = 2\left(t + \frac{CT^2}{2r} + \frac{CX^2}{2r}\right)\text{------}(9)$$

which is the general equation, and which contains only one variable, to-wit, the distance CX.

If the lens is perfectly centered as in Fig.

10, then CT equals zero, and equation 9 becomes $$(x+y) = 2\left(t + \frac{CX^2}{2r}\right) \quad \text{------ (10)}$$

If, on the other hand, CX be made equal to zero, in equation 9, the thickness of the doublet at its thinnest point C is seen to be $$2c = 2\left(t + \frac{CT^2}{2r}\right) \quad \text{--------- (11)}$$

Equation 9 may therefore be re-written in the simpler, and equally general form $$(x+y) = 2\left(c + \frac{CX^2}{2r}\right) \quad \text{------ (12)}$$

which is similar to equation 10, found above, for the Fig. 10 symmetrical doublet, whose axis of symmetry is C M.

The unsymmetrical doublet, Fig. 8, must therefore have the same effective thickness, at any distance CX from C, as such doublet would have had, if the full lens L' of Fig. 9 had been accurately centered, but made a trifle thicker. This is easily proved by noting that if lens L', in Fig. 9, had been accurately centered, the resultant doublet would have thicknesses $(x'+y')$ given by equation 10, instead of the thicknesses $(x+y)$ given by equation 12; and the difference, to-wit: $(x+y) - (x'+y')$ is evidently equal to the constant $2(c-t)$.

Note 1.—The position of point C is solely dependent upon the position of the dividing line HK that produces the two rectangular segments 50', 51'; hence, these segments may be unequally high without interfering with the self-corrective property of the resultant doublet.

Note 2.—Where the two faces of the lens are curved, the curvature $1/r$ which occurs in the above formulæ as a factor, should be that obtained by adding the curvatures $1/r'$ and $1/r''$ of the given lens, noting that a convex surface must, for present purposes, be negative.

Note 3.—Where a given full lens is split either exactly, or only approximately, through its thinnest point, and then has its separated elements separately trimmed to rectangular form, the two thus obtained rectangular segments 60, 61 are apt to be, as in Fig. 11, offset elements of the original full and undivided lens, with two different centers C, C'; so that neither of the two conditions laid down by equations 1 and 2 above, can be satisfied, and the self-corrective feature is lost.

What I claim as my invention and desire to secure by Letters Patent is:

1. The combination with a photographic camera, of a finder therefor comprising a divergent eccentric lens formed by dividing a full lens on a meridian plane of such full lens; the field of such finder being made to correspond in form and extent with the camera field.

2. The combination with a photographic camera, of a finder therefor comprising two or more divergent eccentric lenses each taken in a full lens by dividing such full lens on a meridian plane, the field of such finder being made to correspond in form and extent with the camera field.

3. An eccentric lens used as finder, and a chamber adapted to hold the same, said chamber having front and rear openings so arranged as to appear to register when the operator's eye is in the proper relative position of use.

4. An eccentric divergent lens finder, consisting of one or more half lenses, and means for determining the direction of the position to be occupied by the observer's eye with relation to the said finder.

In testimony whereof, I have signed my name to this specification.

JOSEPH BECKER.

Witnesses:
W. N. FREEMAN,
MAUDE A. FREEMAN.